United States Patent
Barry et al.

(10) Patent No.: US 10,931,528 B2
(45) Date of Patent: Feb. 23, 2021

(54) LAYER-BASED METHOD AND SYSTEM FOR DEFINING AND ENFORCING POLICIES IN AN INFORMATION TECHNOLOGY ENVIRONMENT

(71) Applicant: VCE IP Holding Company LLC, Hopkinton, MA (US)

(72) Inventors: Patrick Barry, Banteer (IE); Ryan Andersen, Belmont, MA (US); Nitin John, Sudbury, MA (US); Seamus Kerrigan, Cork (IE)

(73) Assignee: VCE IP Holding Company LLC, Hopkinton, MA (US)

( * ) Notice: Subject to any disclaimer, the term of this patent is extended or adjusted under 35 U.S.C. 154(b) by 77 days.

(21) Appl. No.: 15/971,338

(22) Filed: May 4, 2018

(65) Prior Publication Data
US 2019/0342176 A1    Nov. 7, 2019

(51) Int. Cl.
*H04L 12/24* (2006.01)
*H04L 29/06* (2006.01)
*G06F 16/903* (2019.01)

(52) U.S. Cl.
CPC ........ *H04L 41/0893* (2013.01); *G06F 16/903* (2019.01); *H04L 41/085* (2013.01); *H04L 41/0823* (2013.01); *H04L 63/16* (2013.01)

(58) Field of Classification Search
CPC ............. H04L 41/0893; H04L 41/0823; H04L 41/085; H04L 63/16; G06F 16/903
See application file for complete search history.

(56) References Cited

U.S. PATENT DOCUMENTS

| | | | |
|---|---|---|---|
| 9,088,570 B2* | 7/2015 | Anderson | H04L 67/10 |
| 9,274,917 B2* | 3/2016 | Milojicic | G06F 9/5083 |
| 9,386,040 B2* | 7/2016 | Hu | H04L 41/0893 |
| 9,762,619 B1* | 9/2017 | Vaidya | G06F 9/455 |
| 2007/0050764 A1* | 3/2007 | Traut | G06F 9/45558 |
| | | | 718/1 |
| 2011/0125895 A1* | 5/2011 | Anderson | H04L 63/0815 |
| | | | 709/224 |
| 2013/0263214 A1* | 10/2013 | Yamagata | H04L 47/808 |
| | | | 726/1 |
| 2013/0339568 A1* | 12/2013 | Corrie | G06F 9/45558 |
| | | | 711/6 |
| 2019/0182338 A1* | 6/2019 | Glover | H04L 43/0805 |
| 2019/0199577 A1* | 6/2019 | Burgarella | H04L 41/024 |
| 2019/0268229 A1* | 8/2019 | Haapanen | H04L 41/0893 |

* cited by examiner

*Primary Examiner* — John A Follansbee
*Assistant Examiner* — Raqiul A Choudhury
(74) *Attorney, Agent, or Firm* — Chamberlain Hrdlicka

(57) ABSTRACT

A layer-based method and system for defining and enforcing policies in an information technology (IT) environment. Specifically, the disclosed method and system propose and implement a layer-based infrastructure management model, which partitions the scope and problem set of application and operational policy definition and/or enforcement into a hierarchy of abstraction layers.

18 Claims, 14 Drawing Sheets

LAYER-BASED METHOD AND SYSTEM FOR DEFINING AND ENFORCING POLICIES IN AN INFORMATION TECHNOLOGY ENVIRONMENT

BACKGROUND

Information technology infrastructure consists of various different resources, which support various application workloads. The infrastructure is often managed by infrastructure administrators, while application requirements of the infrastructure are typically specified by application developers. Due to a lack of standards and taxonomy definition between infrastructure administrators and application developers, the configuration of the infrastructure, as well as the placement of the application workloads on the infrastructure, tend to be sub-optimal.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-8, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a layer-based method and system for defining and enforcing policies in an information technology (IT) environment. Specifically, one or more embodiments of the invention propose and implement a layer-based infrastructure management model, which partitions the scope and problem set of application and operational policy definition and/or enforcement into a hierarchy of abstraction layers.

Figure 1:
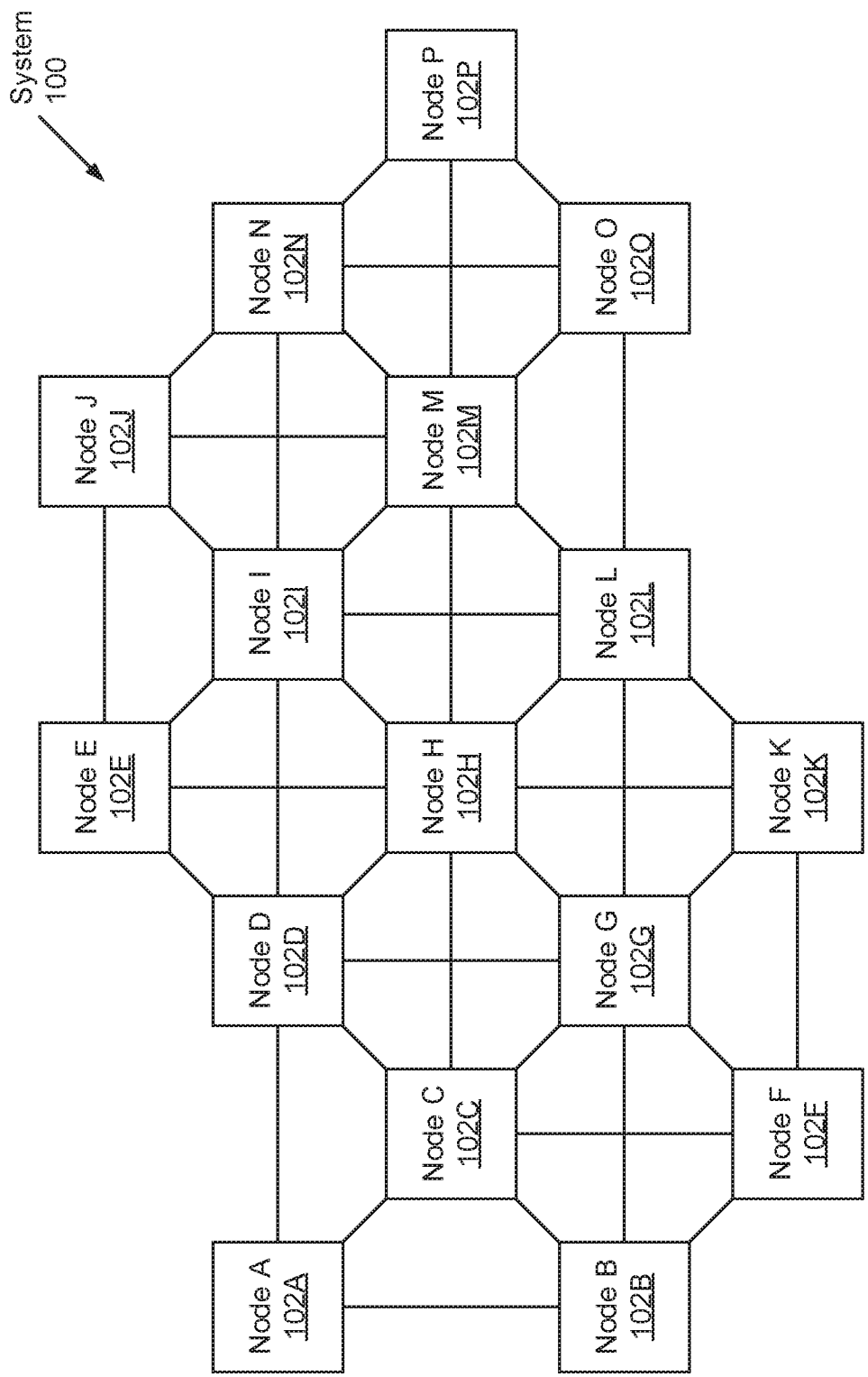
FIG. 1 shows a system in accordance with one or more embodiments of the invention.

FIG. 1 shows a system in accordance with one or more embodiments of the invention. The system (100) may refer to any datacenter and/or cloud computing infrastructure. Specifically, the system (100) may refer to any configuration of various information technology (IT) components, which include, but are not limited to, multiple operatively connected nodes (102A-102P).

In one embodiment of the invention, a node (102A-102P) may refer to a physical appliance, which works towards servicing one or more usage scenarios. For example, a usage scenario may be directed to large-scale and complex data processing. Accordingly, a node (102A-102P) may include various resources (e.g., compute resources, storage resources, network resources, and virtualization resources) (not shown), which may be allocated to support various tasks and/or applications executing thereon. In one embodiment of the invention, a node (102A-102P) may be a server. In another embodiment of the invention, a node (102A-102P) may be any computing system similar to the exemplary computing system shown in FIG. 8. Furthermore, a node (102A-102P) may include functionality to implement zero or more abstraction layers of a layer-based policy definition and enforcement (PDE) model directed to infrastructure management (see e.g., FIG. 2). Moreover, for each implemented abstraction layer, a node (102A-102P) may include further functionality to host an abstraction layer instance (ALI) or an abstraction layer controller (ALC) (see e.g., FIGS. 3-4B). One of ordinary skill will appreciate that a node (102A-102P) may perform other functionalities without departing from the scope of the invention.

In one embodiment of the invention, a node (102A-102P) may be directly or indirectly connected to one or more other nodes (102A-102P) through a network (not shown) (e.g., a local area network (LAN), a wide area network (WAN) such as the Internet, a mobile network, or any other network). The network may be implemented using any combination of wired and/or wireless connections. In embodiments in which the aforementioned components are indirectly connected, there may be other networking components or systems (e.g., switches, routers, gateways, etc.) that facilitate communications, information exchange, and/or resource sharing. Further, various nodes (102A-102P) may communicate with one another using any combination of wired and/or wireless communication protocols.

While FIG. 1 shows a configuration of components, other system configurations may be used without departing from the scope of the invention.

Figure 2:
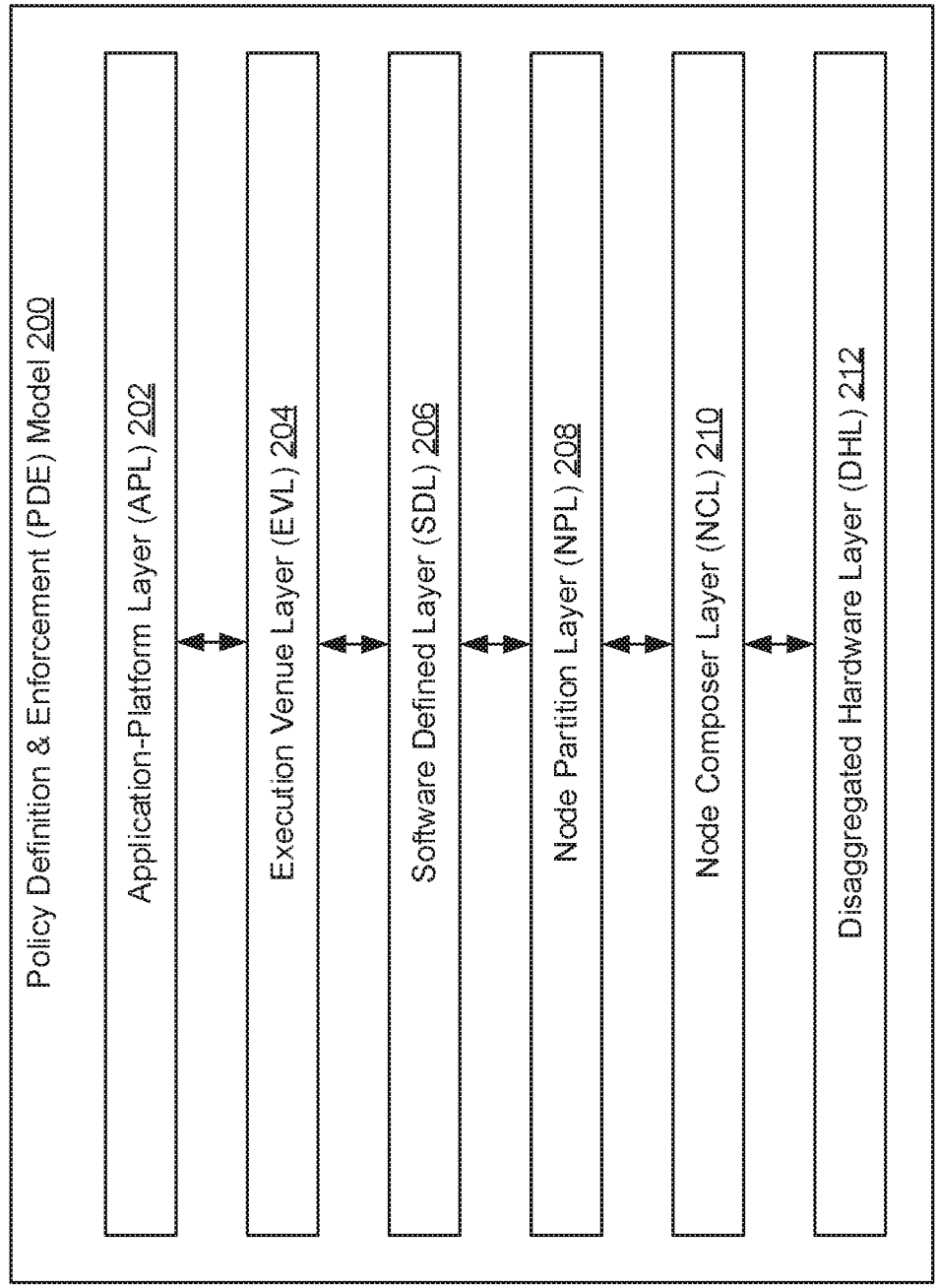
FIG. 2 shows a policy definition and enforcement model in accordance with one or more embodiments of the invention.

FIG. 2 shows a policy definition and enforcement (PDE) model in accordance with one or more embodiments of the invention. The PDE model (200) may outline a networking framework to implement infrastructure management policies in layers, with policy fulfillment passed from one layer to the next. Infrastructure management may pertain to the appropriate allocation and/or configuration of infrastructure to optimally support and execute application workloads. Further, infrastructure management may entail the codification of application requirements (i.e., application policies) in view of infrastructure operational boundaries or constraints (i.e., operational policies).

In one embodiment of the invention, the PDE model (200) may partition the scope and problem set of implementing infrastructure management policy into several abstraction layers in a logical progression. Each abstraction layer may: (i) be managed and/or optimized independently; (ii) adhere to a layer-specific northbound application programming interface (API) (described below); (iii) implement a clear function and policy scope; (iv) allow for the definition of application and/or operational policies; (v) combine application and operational policy enforcement; (vi) translate and expand policies at its layer to southbound (or lower) abstraction layers; and (vii) includes lifecycle management (LCM) capability.

In one embodiment of the invention, the abstraction layers pertaining to the PDE model (200) may include an application-platform layer (APL) (202), an execution venue layer (EVL) (204), a software defined layer (SDL) (206), a node partition layer (NPL) (208), a node composer layer (NCL) (210), and a disaggregated hardware layer (DHL) (212). Each of these abstraction layers is described below (in reverse order).

In one embodiment of the invention, the DHL (212) may track and provide physical node resources, across multiple nodes in an information technology (IT) environment, to fulfill one or more application policies. A physical node resource may pertain to a compute resource, a storage resource, or a network resource —each of which is described below.

Further, in one embodiment of the invention, the DHL (212) may include functionality to: receive resource queries from the NCL (210) pertaining to resource (i.e., physical node resources) availability for the fulfillment of application policies; process the resource queries to identify (or not identify) unallocated resources; if unallocated resources are identified, validate the unallocated resources in view of one or more operational policies; if the unallocated resources are unrestricted by the operational policies, generate access and security credentials, as well as cost metrics (optionally), for the unallocated resources; issue query responses to the NCL (210), addressing the resource queries, based on outcomes of the processing; receive implementation instructions from the NCL (210) pertaining to resource allocation (if unallocated resources were identified earlier); and process the implementation instructions to allocate the unallocated resources (if identified earlier) in order to, at least in part, instantiate application workloads.

In one embodiment of the invention, a node compute resource may refer to a measurable quantity of a compute-relevant resource type that can be requested, allocated, and consumed. A compute-relevant resource type may pertain to a physical device (i.e., hardware) and pertinent logical intelligence (i.e., firmware), which provide some computing capacity to a node. Further, each compute-relevant resource type may be quantified through a respective base unit. By way of an example, a central processing unit (CPU) or a graphical processing unit (GPU) may exemplify a compute-relevant resource type, which may each be specified in base units of cores. By way of another example, memory may further exemplify a compute-relevant resource type, which may be specified in base units of bytes.

In one embodiment of the invention, a node storage resource may refer to a measurable quantity of a storage-relevant resource type that can be requested, allocated, and consumed. A storage-relevant resource type may pertain to a physical device (i.e., hardware) and pertinent logical intelligence (i.e., firmware), which provide some storage capacity to a node. Further, each storage-relevant resource type may be quantified through a respective base unit. By way of an example, a hard disk drive (HDD), a solid state drive (SSD), and flash memory may each exemplify a storage-relevant resource type, which may each be specified in base units of bytes.

In one embodiment of the invention, a node network resource may refer to a measurable quantity of a network-relevant resource type that can be requested, allocated, and consumed. A network-relevant resource type may pertain to a physical device (i.e., hardware) and pertinent logical intelligence (i.e., firmware), which provide some network capacity to a node. Further, each network-relevant resource type may be quantified through a respective base unit. By way of an example, a network interface card (NIC) or host bus adapter (HBA) may each exemplify a network-relevant resource type, which may each be specified in base units of bits per second (bps) (i.e., directed to bandwidth).

In one embodiment of the invention, the NCL (210) may track and provide complete computing systems, across multiple nodes in an IT environment, to fulfill one or more application policies. In one embodiment of the invention, a complete computing system may refer to a stock (i.e., off-the-shelf, not designed or made to order) physical appliance such as, for example, a bare-metal server. In another embodiment of the invention, a complete computing system may refer to a custom (i.e., suited, made to order) physical and/or virtual appliance formed from the aggregation of various co-located or distributed physical node resources (described above), which may have been identified by the DHL (212).

Further, in one embodiment of the invention, the NCL (210) may include functionality to: receive resource queries from the NPL (208) pertaining to resource (i.e., complete computing systems) availability for the fulfillment of application policies; process the resource queries to identify (or not identify) unallocated resources; if unallocated resources are identified, validate the unallocated resources in view of one or more operational policies; if the unallocated resources are unrestricted by the operational policies, generate access and security credentials, as well as cost metrics (optionally), for the unallocated resources; alternatively, if unallocated resources are not identified, issue other resource queries directed to the DHL (212) pertaining to other resource (i.e., physical node resources) availability for the fulfillment of application policies; receive query responses from the DHL (212), which address the issued other resource queries; issue other query responses to the NPL (208), addressing the resource queries, based on outcomes of the processing; receive implementation instructions from the NPL (208) pertaining to resource allocation (if unallocated resources were identified earlier); process the implementation instructions to allocate the unallocated resources (if identified earlier) in order to, at least in part, instantiate application workloads; and relay the implementation instructions to the DHL (212).

In one embodiment of the invention, the NPL (208) may track and provide physical and/or logical isolation for tenant computing clusters, across multiple nodes in an IT environment, to fulfill one or more application policies. A tenant computing cluster may refer to one or more complete computing systems (described above), which may pertain to a single tenant of the IT environment. A tenant may refer to an individual, a group of individuals, or an entity whom retain access and privileges to their respective tenant computing cluster. Further, the physical and/or logical isolation of a tenant computing cluster may be directed to fault tolerance or failover risk management.

Moreover, in one embodiment of the invention, the NPL (208) may include functionality to: receive resource queries from the SDL (206) pertaining to resource (i.e., tenant computing cluster isolation) availability for the fulfillment of application policies; process the resource queries to identify (or not identify) unallocated resources; if unallocated resources are identified, validate the unallocated resources in view of one or more operational policies; if the unallocated resources are unrestricted by the operational policies, generate access and security credentials, as well as cost metrics (optionally), for the unallocated resources; alternatively, if unallocated resources are not identified, issue other resource queries directed to the NCL (210) pertaining to other resource (i.e., complete computing systems) availability for the fulfillment of application policies; receive query responses from the NCL (210), which address the issued other resource queries; issue other query responses to the SDL (206), addressing the resource queries, based on outcomes of the processing; receive implementation instructions from the SDL (206) pertaining to resource allocation (if unallocated resources were identified earlier); process the implementation instructions to allocate the unallocated resources (if identified earlier) in order to, at least in part, instantiate application workloads; and relay the implementation instructions to the NCL (210).

In one embodiment of the invention, the SDL (206) may track and provide virtualized node resources, across multiple nodes in an IT environment, to fulfill one or more application policies. A virtualized node resource may pertain to a virtualized compute resource, a virtualized storage resource, or a virtualized network resource, which refer to virtual versions of a compute resource, a storage resource, and a network resource (described above), respectively. Through virtualization, physical node resources on one or more nodes (constituting a node cluster) can be combined into a logical pool of those resources (i.e., a cluster resource pool of virtual node resources). Substantively, the virtualization of physical node resources into virtual node resources may facilitate management of physical node resources across multiple nodes by a single entity (e.g., an abstraction layer controller (ALC) (described below)). Similarly, the virtualization of physical node resources into virtual node resources may facilitate the provisioning of physical node resources across multiple nodes, by a single entity, as needed (i.e., towards application policy fulfillment by a multi-node hosted abstraction layer).

Further, in one embodiment of the invention, the SDL (206) may include functionality to: receive resource queries from the EVL (204) pertaining to resource (i.e., virtualized node resources) availability for the fulfillment of application policies; process the resource queries to identify (or not identify) unallocated resources; if unallocated resources are identified, validate the unallocated resources in view of one or more operational policies; if the unallocated resources are unrestricted by the operational policies, generate access and security credentials, as well as cost metrics (optionally), for the unallocated resources; alternatively, if unallocated resource are not identified, issue other resource queries directed to the NPL (208) pertaining to other resource (i.e., tenant computing cluster isolation) availability for the fulfillment of application policies; receive query responses from the NPL (208), which address the issued other resource queries; issue other query responses to the EVL (204), addressing the resource queries, based on outcomes of the processing; receive implementation instructions from the EVL (204) pertaining to resource allocation (if unallocated resources were identified earlier); process the implementation instructions to allocate the unallocated resources (if identified earlier) in order to, at least in part, instantiate application workloads; and relay the implementation instructions to the NPL (208).

In one embodiment of the invention, the EVL (204) may track and provide runtime environments for application code, across multiple nodes in an IT environment, to fulfill one or more application policies. A runtime environment may refer to a configuration of hardware (e.g., physical node resources) and/or software (e.g., virtualized node resources, operating systems, code interpreters, etc.), which support and sustain the execution of an application (i.e., computer program) on IT infrastructure. By way of examples, a runtime environment may take form as a virtual machine, a container, a web container, a server-less compute environment, or a bare-metal environment. Further, application code may pertain to computer readable program code (or computer instructions), which when executed by any integrated circuit for processing instructions (e.g., a computer processor), implements an application.

Moreover, in one embodiment of the invention, the EVL (204) may include functionality to: receive resource queries from the APL (202) pertaining to resource (i.e., runtime environments) availability for the fulfillment of application policies; process the resource queries to identify (or not identify) unallocated resources; if unallocated resources are identified, validate the unallocated resources in view of one or more operational policies; if the unallocated resources are unrestricted by the operational policies, generate access and security credentials, as well as cost metrics (optionally), for the unallocated resources; alternatively, if unallocated resources are not identified, issue other resource queries directed to the SDL (206) pertaining to other resource (i.e., virtualized node resources) availability for the fulfillment of application policies; receive query responses from the SDL (206), which address the issued other resource queries; issue other query responses to the APL (202), addressing the resource queries, based on outcomes of the processing; receive implementation instructions from the APL (202) pertaining to resource allocation (if unallocated resources were identified earlier); process the implementation instructions to allocate the unallocated resources (if identified earlier) in order to, at least in part, instantiate application workloads; and relay the implementation instructions to the SDL (206).

In one embodiment of the invention, the APL (202) may track and provide application lifecycle tools, across multiple nodes in an IT environment, to fulfill one or more application policies. An application lifecycle tool may refer to any software resource that supports application building, testing, deploying, managing, and/or updating. Furthermore, the APL (202) may further track and provide platform-as-a-service (PaaS) resources and/or functions, across multiple nodes in the IT environment, to further fulfill one or more application policies. In one embodiment of the invention, a PaaS may refer to a cloud-based application development and deployment environment, which may provide a framework and various services towards supporting application development and/or deployment. By way of examples, a PaaS may not only offer infrastructure onto which an application may execute, but also support tools such as middleware, development tools, business intelligence services, operating system integration, networking security, and database management. In one embodiment of the invention, the employment of PaaS resources and/or functions may be optional, as some application policies (i.e., application requirements) do not require such resources and/or functions.

In one embodiment of the invention, the APL (202) may include functionality to: obtain application policy definitions from application developers, which may pertain to application requirements and/or prerequisites; process the application policy definitions to identify (or not identify) unallocated resources (i.e., application lifecycle tools and/or PaaS resources/functions); if unallocated resources are identified, validate the unallocated resources in view of one or more operational policies; if the unallocated resources are unrestricted by the operational policies, generate access and security credentials, as well as cost metrics (optionally), for the unallocated resources; alternatively, if unallocated resource are not identified, issue other resource queries directed to the EVL (204) pertaining to other resource (i.e., runtime environments) availability for the fulfillment of application policies; receive query responses from the EVL (204), which address the issued other resource queries; submit (to the application developers) some or all access and security credentials, as well as some or all cost metrics (optionally), which pertain to the various unallocated resources, identified by some or all abstraction layers, based on outcomes of the processing; receive implementation instructions from the application developers pertaining to resource allocation (if unallocated resources were identified earlier); process the implementation instructions to allocate the unallocated resources (if identified earlier) in order to, at least in part, instantiate application workloads; and relay the implementation instructions to the EVL (204).

Figure 3:
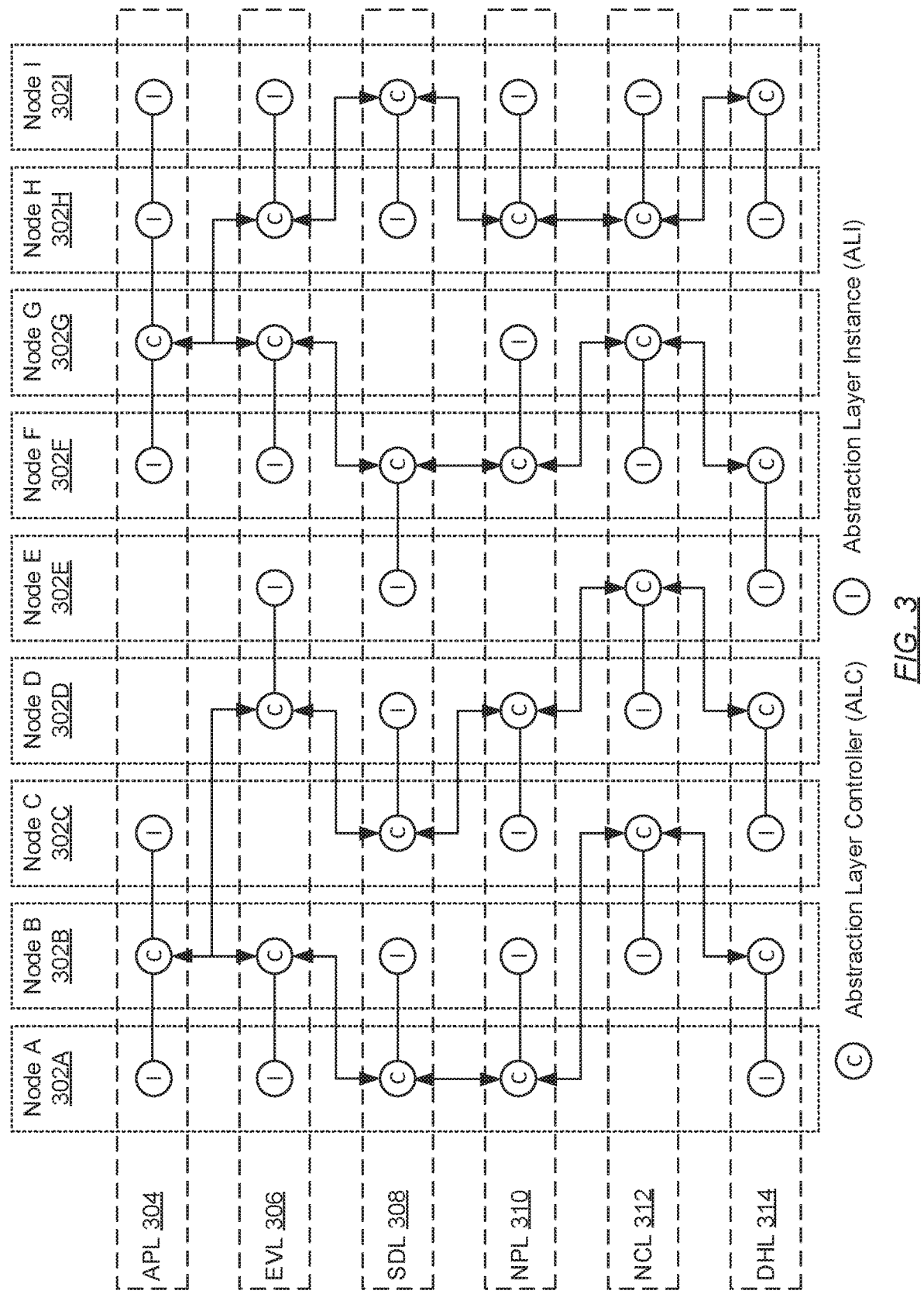
FIG. 3 shows an example layer deployment scheme in accordance with one or more embodiments of the invention.

FIG. 3 shows an example layer deployment scheme in accordance with one or more embodiments of the invention. A layer deployment scheme may refer to a deployment configuration of abstraction layer instances (ALIs) and abstraction layer controllers (ALCs), for each policy definition and enforcement (PDE) (see e.g., FIG. 2) abstraction layer, across multiple nodes of an information technology (IT) environment.

In one embodiment of the invention, an ALI may refer to a logical intelligence (i.e., software) that implements a slave instance of a respective abstraction layer onto a host (i.e., node) on which the ALI may be executing. A slave instance of an abstraction layer may refer to logical intelligence that may include functionality to interact with a master instance (i.e., an ALC) of the same respective abstraction layer. Accordingly, a slave instance may include further functionality to: register with a master instance of the same respective abstraction layer; manage local node resources; sharing availability or capacity information, pertaining to local node resources, with the master instance; and receive resource allocation instructions directed to implementing, at least in part, one or more applications.

In one embodiment of the invention, an ALC may refer to a logical intelligence (i.e., software) that implements a master instance of a respective abstraction layer onto a host (i.e., node) on which the ALC may be executing. A master instance of an abstraction layer may refer to logical intelligence that may include functionality to interact with one or more slave instances (i.e., ALIs) of the same respective abstraction layer, a master instance (i.e., another ALC) of a directly north abstraction layer, and/or one or more master instances (i.e., other ALCs) of a directly south abstraction layer. Accordingly, a master instance may include further functionality to: substantively perform any of the above-mentioned functionalities of any abstraction layer (outlined above in FIG. 2); acknowledge one or more slave instances of the same respective abstraction layer; manage cluster resources (i.e., local node resources available on the local node on which the ALC may be executing, as well as remote node resources available on one or more remote nodes on which one or more slave instances (of the same respective abstraction layer) may be executing); register with a master instance of a directly north abstraction layer; and issue resource allocation instructions, if necessary, to one or more slave instances (of the same respective abstraction layer) directed to implementing, at least in part, one or more applications.

In one embodiment of the invention, any single node (302A-302I) of an IT environment may host an ALI and/or an ALC of zero or more abstraction layers. For example, the example layer deployment scheme shows that Node A (302A) may host: (i) an ALI for the application-platform layer (APL) (304); (ii) an ALI for the execution-venue layer (EVL) (306); (iii) an ALC for the software-defined layer (SDL) (308); (iv) an ALC for the node-partition layer (NPL) (310); (v) neither an ALI nor an ALC for the node-composer layer (NCL) (312); and (vi) an ALI for the disaggregated-hardware layer (DHL) (314). Furthermore, in one embodiment of the invention, any single abstraction layer (304, 306, 308, 310, 312, 314) may execute one or more ALCs, where each ALC of a respective abstraction layer may interact with one ALC of a directly north abstraction layer and one or more ALCs of a directly south abstraction layer. Moreover, each ALC of a respective abstraction layer may interact with a subset of ALIs, pertaining to a node cluster, across the IT environment, where the IT environment may be partitioned into one or more node clusters.

Figure 4A:
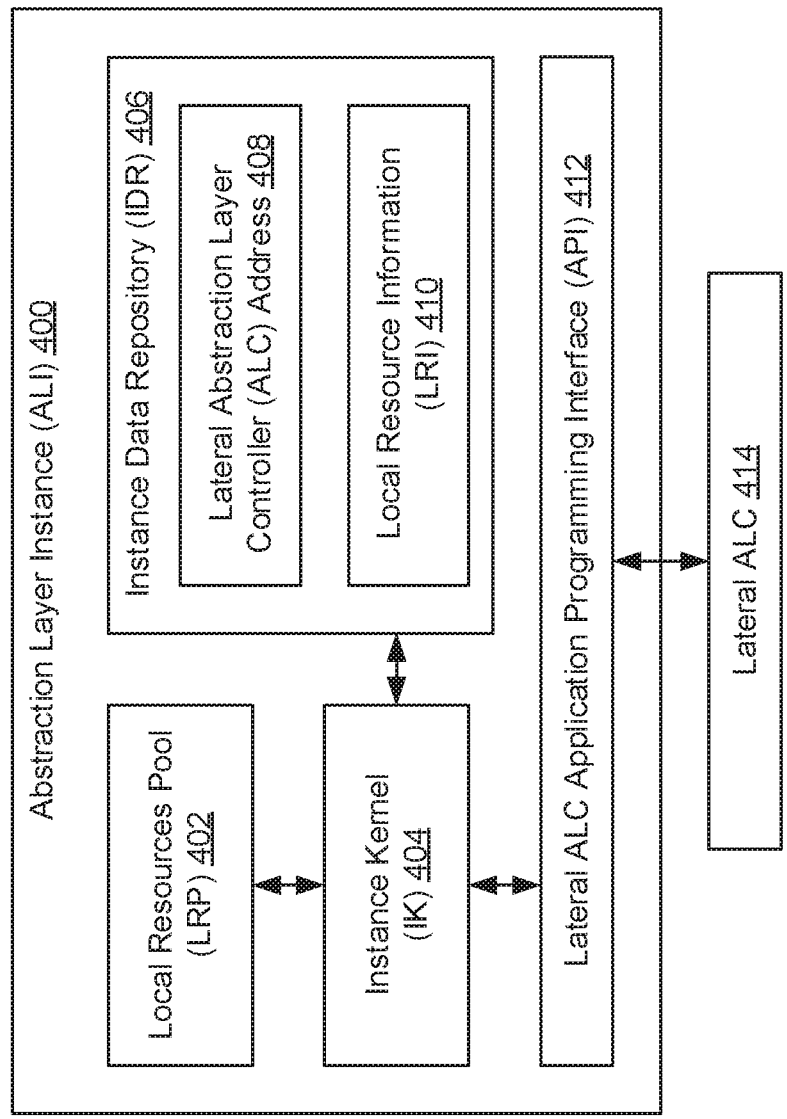
FIG. 4A shows an abstraction layer instance in accordance with one or more embodiments of the invention.

FIG. 4A shows an abstraction layer instance (ALI) in accordance with one or more embodiments of the invention. As described above, an ALI (400) may refer to a logical intelligence (i.e., software) that implements a slave instance of a respective abstraction layer onto a host (i.e., node) on which the ALI may be executing. To that end, an ALI (400) may include a local resource pool (LRP) (402), a instance kernel (IK) (404), an instance data repository (IDR) (406), and a lateral abstraction layer controller (ALC) application programming interface (API) (412). Each of these components is described below.

In one embodiment of the invention, the LRP (402) may refer to a logical container or abstraction for the flexible management of node resources (i.e., local resources residing on the node on which the ALI (400) may be executing). Node resources may pertain to compute resources, storage resources, network resources, and/or any virtualized resources of one or more of the aforementioned three resource types. Further, the LRP (402) may be managed by the IK (404). Management of the LRP (402) may entail allocating and deallocating local node resources as necessary. In one embodiment of the invention, the IK (404) may refer to a computer program or process (i.e., an instance of a computer program) that performs any and all ALI (400) functionalities (described above with respect to FIG. 3).

In one embodiment of the invention, the IDR (406) may refer to at least a portion of a storage system or media for consolidating various forms of ALI (400) pertinent information. The IDR (406) may be implemented across one or more physical and/or virtual storage units or devices, which may or may not be of the same type. Furthermore, the information consolidated in the IDR (406) may be arranged using any storage mechanism (e.g., a filesystem, a database, a collection of tables, etc.). In one embodiment of the invention, the IDR (406) may be implemented using persistent (i.e., non-volatile) storage media. Examples of persistent storage media include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM).

Moreover, in one embodiment of the invention, information consolidated in the IDR (406) may include, but is not limited to, a lateral ALC address (408) and local resource information (LRI) (410). The lateral ALC address (408) may encompass an Internet Protocol (IP) address, or a uniform resource locator (URL), associated with an ALC of the same respective abstraction layer (i.e., a lateral ALC (414)). The lateral ALC address (408) may be used by the ALI (400) to, for example, register, exchange information, and share resources, with the associated lateral ALC (414). Further, in one embodiment of the invention, LRI (410) may refer to any and all metadata pertaining to the LRP (402). By way of examples, the LRI (408) may entail: resource allocation information directed to mapping allocated resources, specified in the LRP (402), to one or more implemented applications; local resource capacity or availability information directed to unallocated resources specified in the LRP (402); and access and/or security credentials for allocated and unallocated resources. One of ordinary skill will appreciate that the IDR (406) may consolidate other information without departing from the scope of the invention. Moreover, the IDR (406) may be maintained by the IK (404).

In one embodiment of the invention, the lateral ALC API (412) may be a hardware and/or software implemented construct that employs a set of subroutine definitions, protocols, and/or tools for enabling communications, information exchange, and/or resource sharing, between the ALI (400) and a lateral ALC (414). To that end, the lateral ALC API (412) may include functionality to: receive and issue API requests from and to the lateral ALC (414), respectively; and, subsequently, delegate received API requests, and obtain information for issued API requests, from the IK (404). One of ordinary skill will appreciate that the lateral ALC API (412) may perform other functionalities without departing from the scope of the invention. By way of an example, the lateral ALC API (412) may be a web API.

Figure 4B:
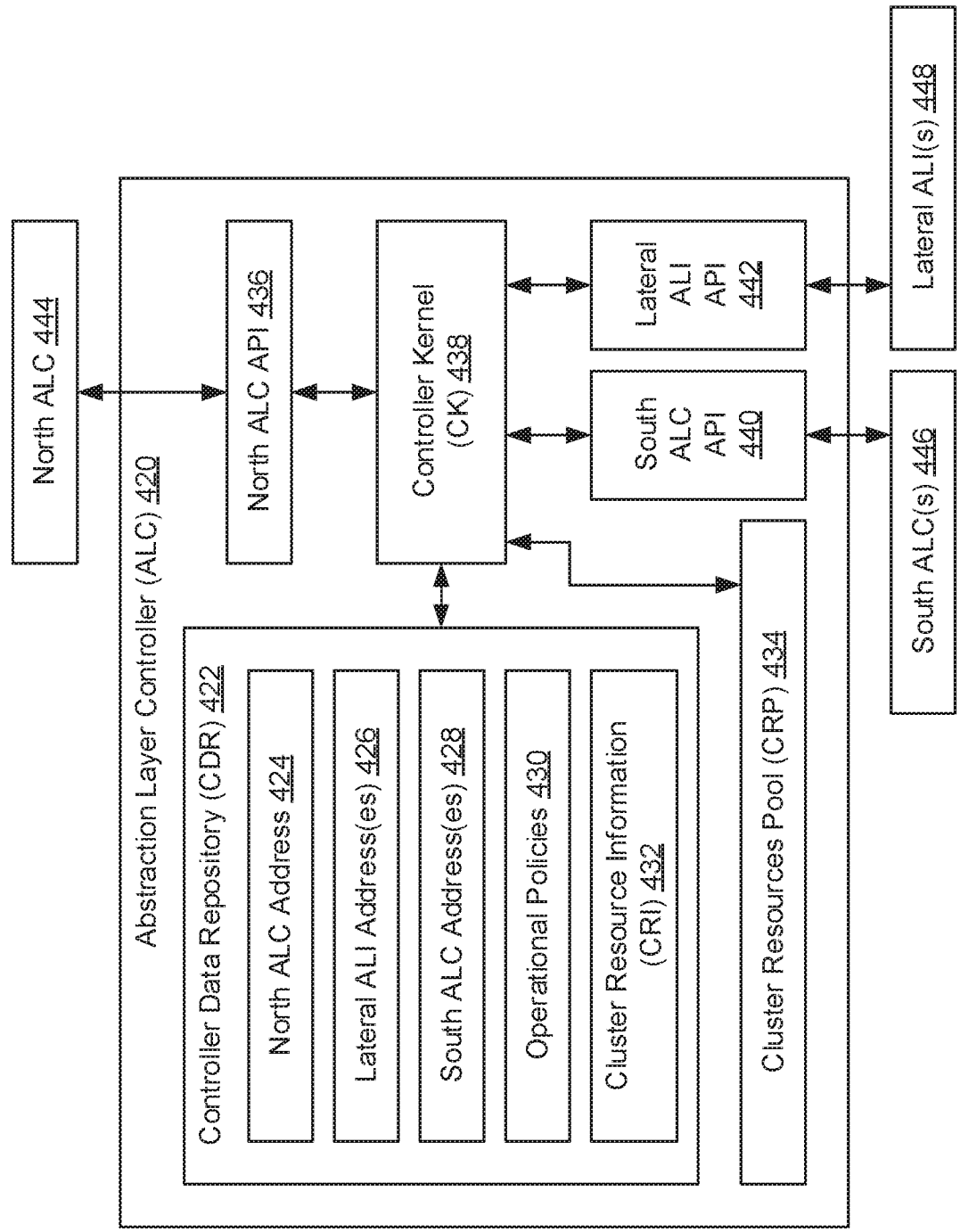
FIG. 4B shows an abstraction layer controller in accordance with one or more embodiments of the invention.

FIG. 4B shows an abstraction layer controller (ALC) (420) in accordance with one or more embodiments of the invention. As described above, an ALC (420) may refer to a logical intelligence (i.e., software) that implements a master instance of a respective abstraction layer onto a host (i.e., node) on which the ALC (420) may be executing. To that end, an ALC (420) may include a controller data repository (CDR) (422), a cluster resources pool (CRP) (434), a north ALC application programming interface (API) (426), a controller kernel (CK) (438), a south ALC API (440), and a lateral abstraction layer instance (ALI) API (442). Each of these components is described below.

In one embodiment of the invention, the CDR (422) may refer to at least a portion of a storage system or media for consolidating various forms of ALC (420) pertinent information. The CDR (422) may be implemented across one or more physical and/or virtual storage units or devices, which may or may not be of the same type. Furthermore, the information consolidated in the CDR (422) may be arranged using any storage mechanism (e.g., a filesystem, a database, a collection of tables, etc.). In one embodiment of the invention, the CDR (422) may be implemented using persistent (i.e., non-volatile) storage media. Examples of persistent storage media include, but are not limited to: optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage media defined as non-volatile Storage Class Memory (SCM). Moreover, the CDR (422) may be maintained by the CK (438). One of ordinary skill will appreciate that the CDR (432) may consolidate other information without departing from the scope of the invention.

Moreover, in one embodiment of the invention, information consolidated in the CDR (422) may include, but is not limited to, a north ALC address (424), one or more lateral ALI addresses (426), one or more south ALC addresses (428), one or more operational policies (430), and cluster resource information (CRI) (432). The north ALC address (424) may encompass an Internet Protocol (IP) address, or a uniform resource locator (URL), associated with an ALC of a directly northbound abstraction layer (i.e., a north ALC (444)). The north ALC address (424) may be used by the ALC (420) to, for example, register and exchange information with the associated north ALC (444).

In one embodiment of the invention, a lateral ALI address may encompass an IP address, or a URL, associated with an ALI of a same respective abstraction layer (i.e., a lateral ALI (448)). A lateral ALI address (426) may be used by the ALC (420) to, for example, acknowledge, exchange information with, and share resources with, an associated lateral ALI (448). Furthermore, a south ALC address (428) may encompass an IP, or a URL, associated with an ALC of a directly southbound abstraction layer (i.e., a south ALC (446)). A south ALC address (428) may be used by the ALC (420) to, for example, acknowledge and exchange information with an associated south ALC (446).

In one embodiment of the invention, an operation policy may refer to an infrastructure operational boundary or constraint. An infrastructure operational boundary/constraint may entail a rule, regarding the use of information technology (IT) infrastructure, imposed by administrators of the IT environment. Further, the aforementioned rule(s) may be applied at the abstraction layer level. For example, an operational policy directed to the node composer level (NCL) may specify that ten (10) percent of physical infrastructure must be reserved for disaster recovery purposes. By way of another example, an operational policy directed to the software-defined level (SDL) may specify that if the application policy calls for high-level services, volumes across the IT environment must be replicated on storage contained servers residing on different racks.

In one embodiment of the invention, CRI (432) may refer to any and all metadata pertaining to the CRP (434). By way of examples, the CRI (432) may entail: resource allocation information directed to mapping allocated resources, specified in the CRP (434), to one or more implemented applications; local and remote resource capacity or availability information directed to unallocated resources specified in the CRP (434); and access and/or security credentials for allocated and unallocated resources.

In one embodiment of the invention, the CRP (434) may refer to a logical container or abstraction for the flexible management of cluster resources (i.e., local resources residing on the node on which the ALC (420) may be executing and remote resources residing on one or more other nodes on which one or more lateral ALIs (448) may be executing). Cluster resources may pertain to compute resources, storage resources, network resources, and/or any virtualized resources of one or more of the aforementioned three resource types. Further, the CRP (434) may be managed by the CK (438). Management of the CRP (434) may entail allocating and deallocating local and/or remote node resources as necessary. In one embodiment of the invention, the CK (438) may refer to a computer program or process (i.e., an instance of a computer program) that performs any and all ALC (420) functionalities (described above with respect to FIG. 3).

In one embodiment of the invention, the CRP (434) may also specify abstraction layer-specific resources. For example, layer-specific resources of: (a) the disaggregated-hardware layer (DHL) may refer to physical node resources; (b) the node-composer layer (NCL) may refer to complete computing systems; (c) the node-partition layer (NPL) may refer to tenant computing cluster isolation; (d) the software-defined layer (SDL) may refer to virtualized node resources; (e) the execution-venue layer (EVL) may refer to runtime environments; and (f) the application-platform layer (APL) may refer to application lifecycle tools and/or platform-as-a-service (PaaS) resources/functions.

In one embodiment of the invention, the south ALC API (440) may be a hardware and/or software implemented construct that employs a set of subroutine definitions, protocols, and/or tools for enabling communications and information exchange between the ALC (420) and one or more south ALCs (446). To that end, the south ALC API (440) may include functionality to: receive and issue API requests from and to one or more south ALCs (446), respectively; and, subsequently, delegate received API requests, and obtain information for issued API requests, from the CK (438). One of ordinary skill will appreciate that the south ALC API (440) may perform other functionalities without departing from the scope of the invention. By way of an example, the south ALC API (440) may be a web API.

In one embodiment of the invention, the lateral ALI API (442) may be a hardware and/or software implemented construct that employs a set of subroutine definitions, protocols, and/or tools for enabling communications, information exchange, and/or resource sharing, between the ALC (420) and one or more lateral ALIs (438). To that end, the lateral ALI API (442) may include functionality to: receive and issue API requests from and to one or more lateral ALIs (448), respectively; and, subsequently, delegate received API requests, and obtain information for issued API requests, from the CK (438). One of ordinary skill will appreciate that the lateral ALI API (442) may perform other functionalities without departing from the scope of the invention. By way of an example, the lateral ALI API (442) may be a web API.

Figure 5A:
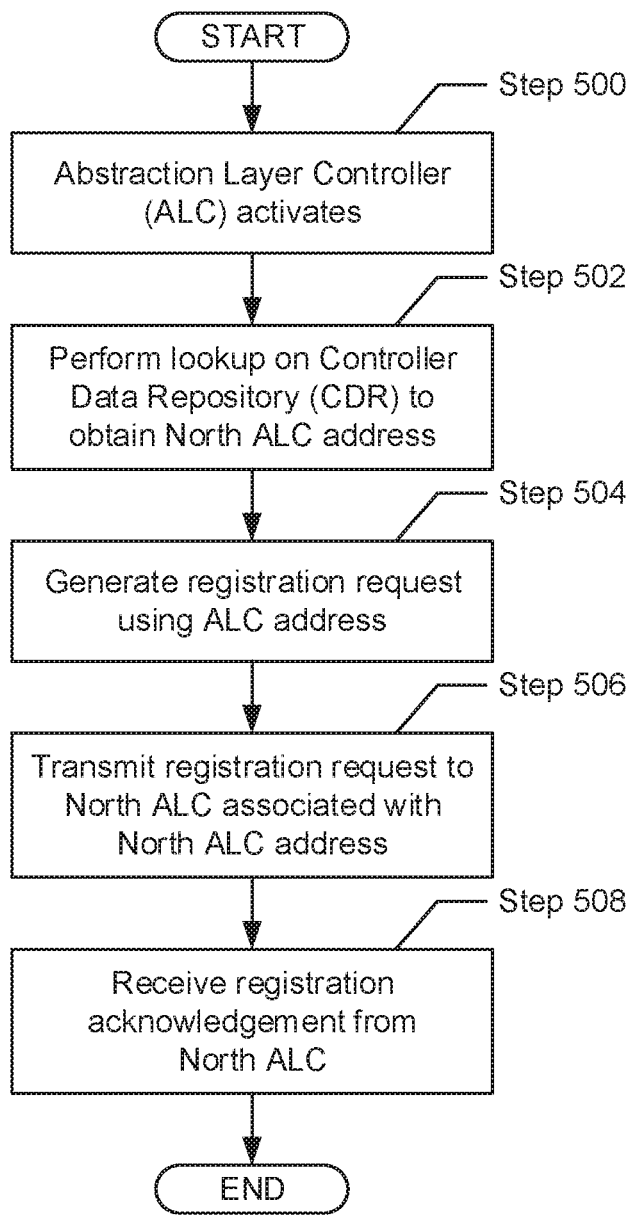
FIG. 5A shows a flowchart describing a method for issuing a registration request in accordance with one or more embodiments of the invention.

FIG. 5A shows a flowchart describing a method for issuing a registration request in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel.

Turning to Step 5A, in Step 500, an abstraction layer controller (ALC) activates. In one embodiment of the invention, an ALC may refer to a logical intelligence (i.e., software) that implements a master instance of a respective abstraction layer onto a host (i.e., node) on which the ALC may be executing. In Step 502, a lookup is performed on a controller data repository (CDR) (see e.g., FIG. 4B) accessible to the ALC (activated in Step 500). Specifically, in one embodiment of the invention, a search may be performed throughout the CDR for a north ALC address. A north ALC address may encompass an Internet Protocol (IP) address, or a uniform resource locator (URL), associated with an ALC of a directly northbound abstraction layer (i.e., a north ALC).

In Step 504, a registration request is generated. In one embodiment of the invention, the registration request may refer to a message that pertains to registering the ALC (activated in Step 500) with a north ALC. Further, the registration request may be generated using at least an ALC address associated with the ALC (activated in Step 500). In Step 506, the registration request (generated in Step 504) is transmitted to the north ALC using, at least in part, the north ALC address (obtained in Step 502). Thereafter, in Step 508, a registration acknowledgement may be received from the north ALC. In one embodiment of the invention, the registration acknowledgement may refer to a message that pertains to the acknowledgement, from the north ALC, addressing registration of the ALC (activated in Step 500).

Figure 5B:
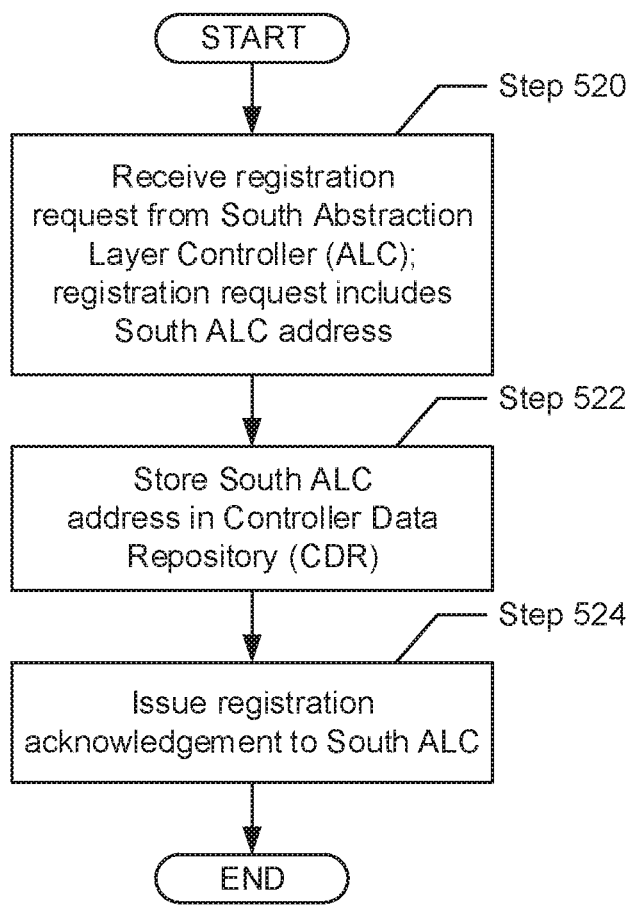
FIG. 5B shows a flowchart describing a method for issuing a registration acknowledgement in accordance with one or more embodiments of the invention.

FIG. 5B shows a flowchart describing a method for issuing a registration acknowledgement in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel.

Turning to FIG. 5B, in Step 520, a registration request is received from a south abstraction layer controller (ALC). A south ALC may refer to a logical intelligence (i.e., software) that implements a master instance of a directly southbound abstraction layer onto a host (i.e., node) on which the south ALC may be executing. For example, a directly southbound abstraction layer for the application-platform layer (APL) is the execution-venue layer (EVL). Further, the registration request may refer to a message that pertains to registering the south ALC with a current ALC (that may be substantively performing the method disclosed in FIG. 5B), where the current ALC represents a north ALC (or a logical intelligence implementing a master instance of a directly northbound abstraction layer) for the south ALC. Moreover, the registration request may include a south ALC address. In one embodiment of the invention, the south ALC address may encompass an Internet Protocol (IP), or a uniform resource locator (URL), associated with the south ALC (from which the registration request had been submitted).

In Step 522, the south ALC address (obtained via the registration request received in Step 520) is stored in a controller data repository (CDR) (see e.g., FIG. 4B) accessible to the above-mentioned current ALC. Thereafter, in Step 524, a registration acknowledgment is issued back to the south ALC. In one embodiment of the invention, the registration acknowledgement may refer to a message that pertains to the acknowledgement, from the current ALC, addressing registration of the south ALC.

Figure 6A:
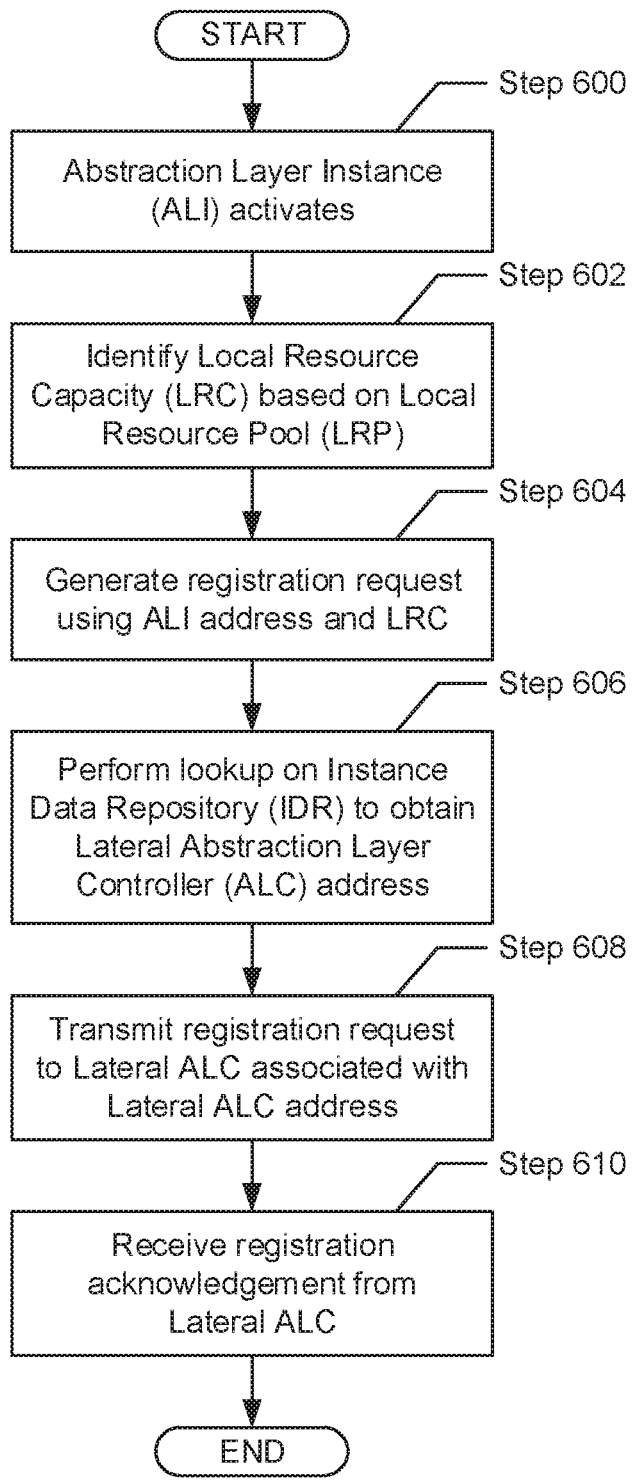
FIG. 6A shows a flowchart describing a method for issuing a registration request in accordance with one or more embodiments of the invention.

FIG. 6A shows a flowchart describing a method for issuing a registration request in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel.

Turning to FIG. 6A, in Step 600, an abstraction layer instance (ALI) activates. In one embodiment of the invention, an ALI may refer to a logical intelligence (i.e., software) that implements a slave instance of a respective abstraction layer onto a host (i.e., node) on which the ALI may be executing. In Step 602, a local resource pool (LRP) accessible to the ALI (activated in Step 600) is assessed to identify/obtain a local resource capacity (LRC). In one embodiment of the invention, the LRC may refer to metadata directed to measured quantities of unallocated compute resources, storage resources, network resources, and/or virtualized resources of any of the aforementioned three resource types, which may be available on the host of the ALI.

In Step 604, a registration request is generated. In one embodiment of the invention, the registration request may refer to a message that pertains to registering the ALI (activated in Step 600) with a lateral ALC. A lateral ALC may refer to a logical intelligence (i.e., software) that implements a master instance of the same respective abstraction layer for which the ALI may be implementing a slave instance). Further, the registration request may be generated using at least an ALI address associated with the ALI (activated in Step 600), and the LRC (identified/obtained in Step 602).

In Step 606, a lookup is performed on an instance data repository (IDR) (see e.g., FIG. 4A) accessible to the ALI (activated in Step 600). Specifically, in one embodiment of the invention, a search may be performed throughout the IDR for a lateral ALC address. A lateral ALC address may encompass an Internet Protocol (IP) address, or a uniform resource locator (URL), associated with the above-mentioned lateral ALC. In Step 608, the registration request (generated in Step 604) is transmitted to the lateral ALC using, at least in part, the lateral ALC address (obtained in Step 606). Thereafter, in Step 610, a registration acknowledgement is received from the lateral ALC. In one embodiment of the invention, the registration acknowledgement may refer to a message that pertains to the acknowledgement, from the lateral ALC, addressing registration of the ALI (activated in Step 600).

Figure 6B:
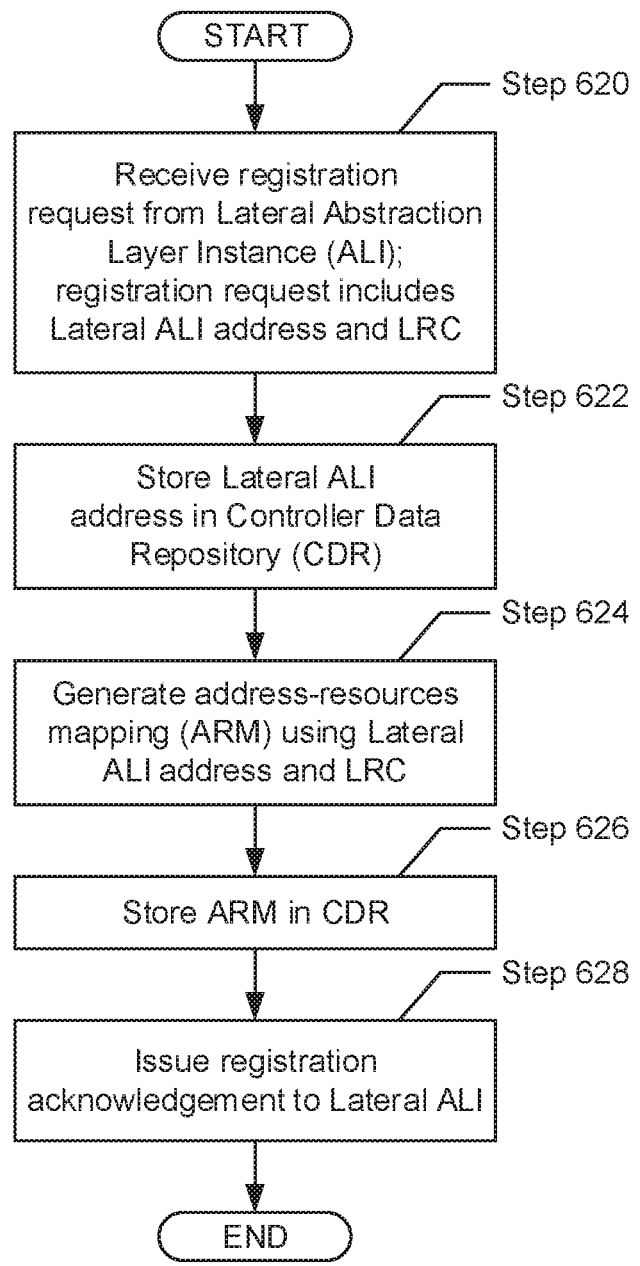
FIG. 6B shows a flowchart describing a method for issuing a registration acknowledgement in accordance with one or more embodiments of the invention.

FIG. 6B shows a flowchart describing a method for issuing a registration acknowledgement in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel.

Turning to FIG. 6B, in Step 620, a registration request is received from a lateral abstraction layer instance (ALI). In one embodiment of the invention, a lateral ALI may refer to a logical intelligence (i.e., software) that implements a slave instance of a respective abstraction layer onto a host (i.e., node) on which the lateral ALI may be executing. Further, the registration request may refer to a message that pertains to registering the lateral ALI with a current abstraction layer controller (ALC) (that may be substantively performing the method disclosed in FIG. 6B), where the current ALC represents a lateral ALC (or a logical intelligence implementing a master instance of the same respective abstraction layer for which the lateral ALI is implementing a slave instance) of the lateral ALI. Moreover, the registration request may include a lateral ALI address and a local resources capacity (LRC). In one embodiment of the invention, the lateral ALI address may encompass an Internet Protocol (IP), or a uniform resource locator (URL), associated with the lateral ALI (from which the registration request had been submitted). The LRC may refer to metadata directed to measured quantities of unallocated compute resources, storage resources, network resources, and/or virtualized resources of any of the aforementioned three resource types, which may be available on the host of the lateral ALI.

In Step 624, the lateral ALI address (obtained via the registration request received in Step 620) is stored in a controller data repository (CDR) (see e.g., FIG. 4B) accessible to the above-mentioned current ALC. In Step 624, an address-resources mapping (ARM) is generated using the lateral ALI address and the LRC (obtained via the registration request received in Step 620). In one embodiment of the invention, the ARM may refer to a tuple linking (or associating) the lateral ALI address to the LRC. Further, in Step 626, the ARM (generated in Step 624) is subsequently stored in the CDR. Thereafter, in Step 628, a registration acknowledgement is issued back to the lateral ALI (from which the registration request had been submitted). In one embodiment of the invention, the registration acknowledgement may be to a message that pertains to an acknowledgement, from the current ALC, that addresses registration of the lateral ALI.

FIGS. 7A-7D show flowcharts describing a method for processing a scoped resource query in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel.

Figure 7A:
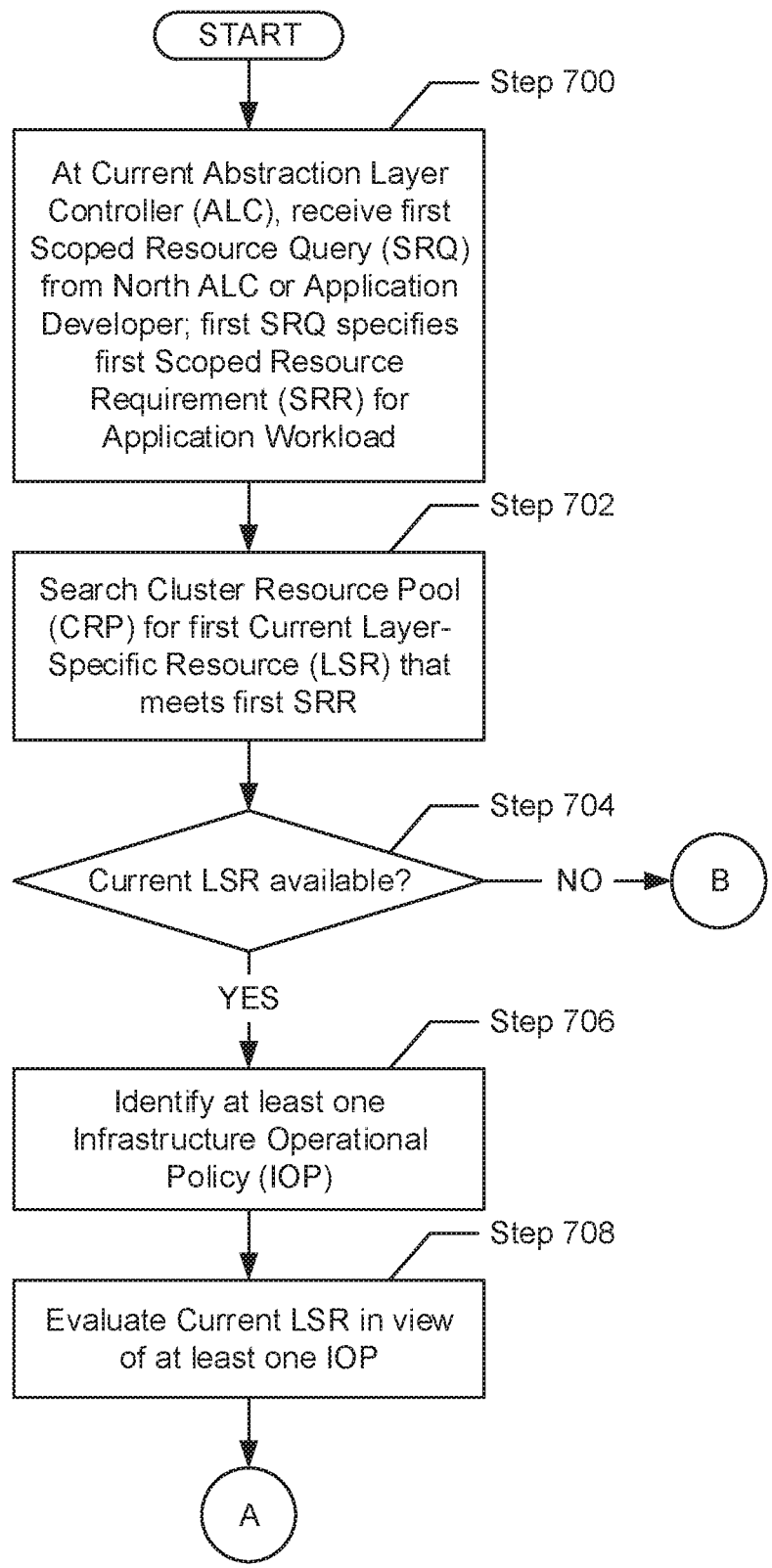
FIGS. 7A-7D show flowcharts describing a method for processing a scoped resource query in accordance with one or more embodiments of the invention.

Turning to FIG. 7A, in Step 700, a first scoped resource query (SRQ) is received at a current abstraction layer controller (ALC). In one embodiment of the invention, the current ALC may refer to a logical intelligence (i.e., software) that implements a master instance of a first abstraction layer onto a host (i.e., physical node). The first abstraction layer may pertain to any one of the abstraction layers that define a layer-based policy definition and enforcement (PDE) model (see e.g., FIG. 2). Further, the first SRQ may be submitted by: (a) a north ALC—i.e., an ALC implementing a master instance of a second abstraction layer, where the second abstraction layer lies directly above the first abstraction layer in the PDE model—when the first abstraction layer refers to a non-application-platform layer (APL); and (b) an application developer when the first abstraction layer refers to the APL.

In one embodiment of the invention, the first SRQ may represent an inquiry directed to the capacity of the first abstraction layer (or at least a portion of the first abstraction layer overseen by the current ALC in embodiments where an abstraction layer may be implemented, at least in part, by multiple ALCs) to fulfill an application policy for an application workload. To that end, the first SRQ may include a first scoped resource requirement (SRR). The first SRR may refer to an infrastructure utilization requirement for hosting the application workload on IT infrastructure, which is filtered to a layer-specific context (or policy scope) (e.g., a policy scope pertaining to the first abstraction layer).

In general, in one embodiment of the invention, an infrastructure utilization requirement may refer to a specification, constraint, or prerequisite directed to implementing a framework for optimally deploying, executing, and/or supporting the application workload on IT infrastructure. The framework may pertain to a sought configuration of IT infrastructure characteristics, capabilities, resources, and/or services that define an ideal computing environment on which the application workload may execute. An infrastructure utilization requirement may further define a framework implementation specification, constraint, or prerequisite in view of one or more objectives directed to, for example, cost, performance, risk mitigation, quality of service, security, availability, fault tolerance, etc.

Moreover, in one embodiment of the invention, a policy scope pertaining to an abstraction layer may refer to an extent of an application policy (i.e., an extent of one or more infrastructure utilization requirements) that is relevant to the abstraction layer. Relevancy may be determined based on the resources and/or services that the abstraction layer tracks and provides towards fulfilling, at least in part, the application policy (or infrastructure utilization requirement(s)).

In Step 702, a cluster resource pool (CRP) is accessed to search for a current layer-specific resource (LSR) that meets the first SRR. In one embodiment of the invention, a LSR may refer to a resource that an abstraction layer specifically tracks and provides. By way of an example, the LSR for the execution-venue layer (EVL) (see e.g., FIG. 2) may encompass a runtime environment. By way of another example, the LSR for the node-composer layer (NCL) may encompass a complete computing system. Accordingly, the current LSR may encompass the resource that the abstraction layer, implemented, at least in part, by the current ALC, specifically tracks and provides.

In Step 704, a determination is made as to whether a/the current LSR (sought in Step 702) is available (i.e., allocated). If it is determined that a/the current LSR, which meets the first SRR (obtained via the first SRQ received in Step 700), is available (or has been allocated), then the process may proceed to Step 706. On the other hand, if it is alternatively determined that a/the current LSR, which meets the first SRR, is unavailable (or remains unallocated), then the process may alternatively proceed to Step 740 (see e.g., FIG. 7C).

In Step 706, after determining (in Step 704) that a/the current LSR, which meets the first SRR, is available (or has been allocated), at least one infrastructure operational policy (IOP) is identified. In one embodiment of the invention, an IOP may refer to an infrastructure operational boundary or constraint. An infrastructure operational boundary/constraint may entail a rule, regarding the use of information technology (IT) infrastructure, imposed by administrators of the IT environment.

In Step 708, the current LSR (identified via the determination in Step 704) is evaluated in view of the at least one IOP (identified in Step 706). Specifically, in one embodiment of the invention, the current LSR may be further assessed to identify whether the current LSR complies with, or alternatively violates, any operational rule(s) imposed by IT environment administrators.

Figure 7B:
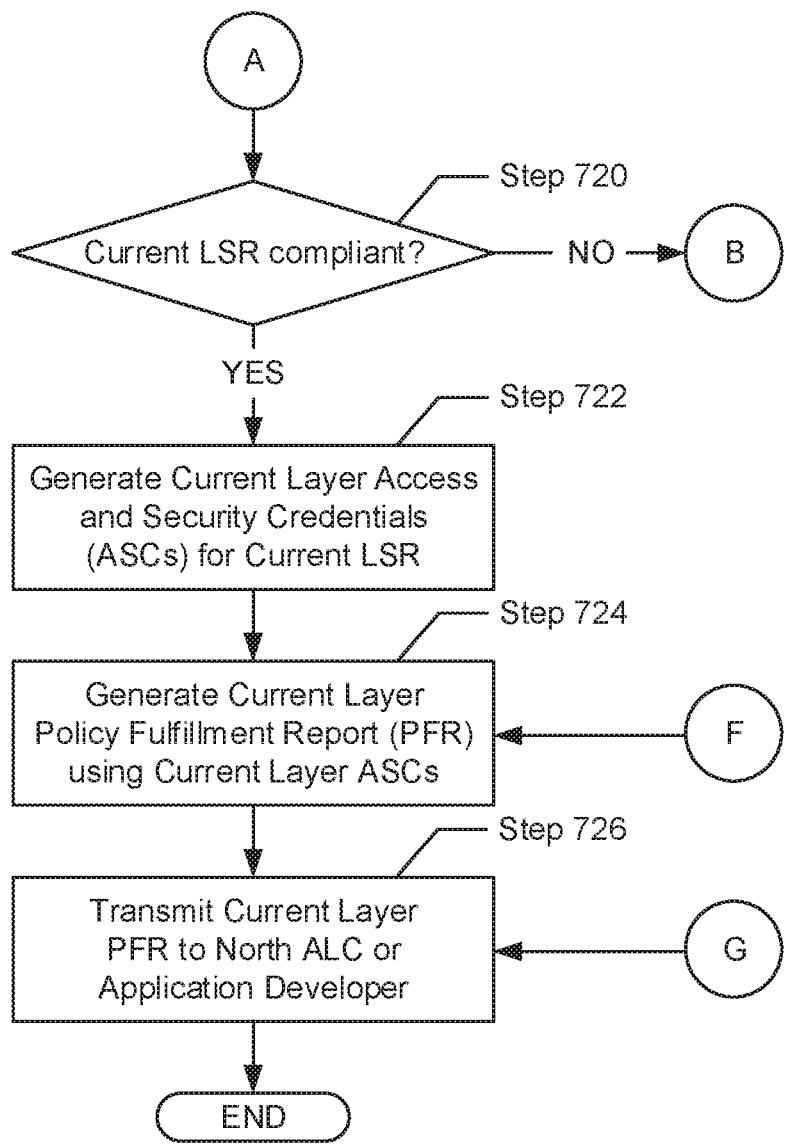

Turning to FIG. 7B, in Step 720, a determination is made as to whether the current LSR (identified via the determination in Step 704) is compliant. In one embodiment of the invention, the current LSR may be compliant when, based on the evaluation (performed in Step 708), the current LSR complies the at least one IOP (identified in Step 706). Conversely, the current LSR may be incompliant when, based on the aforementioned evaluation, the current LSR violates at least one of the IOP(s) (identified in Step 706). Accordingly, if it is determined that the current LSR is compliant, then the process may proceed to Step 722. On the other hand, if it is alternatively determined that the current LSR is incompliant, then the process may alternatively proceed to Step 740 (see e.g., FIG. 7C).

In Step 722, after determining (in Step 720) that the current LSR is compliant of the at least one IOP (identified in Step 706), current layer access and security credentials (ASCs), for the current LSR, are generated. In one embodiment of the invention, access credentials for a resource may refer to information pertinent to accessing or reaching that resource. By way of examples, access credentials may include, but is not limited to, an Internet Protocol (IP) address directed to a resource, and a uniform resource locator (URL) directed to a resource. Further, security credentials for a resource may refer to information pertinent to authentication and access verification for that resource. By way of examples, security credentials may include, but is not limited to, passwords, security tokens, and access keys.

In Step 724, a current layer policy fulfillment report (PFR) is generated. In one embodiment of the invention, the current layer PFR may be generated using the current layer ASCs (generated in Step 722). Further, in Step 726, the current layer PFR (generated in Step 724) is subsequently transmitted to either a north ALC or an application developer (from which the first SRQ had been received in Step 700).

Figure 7C:
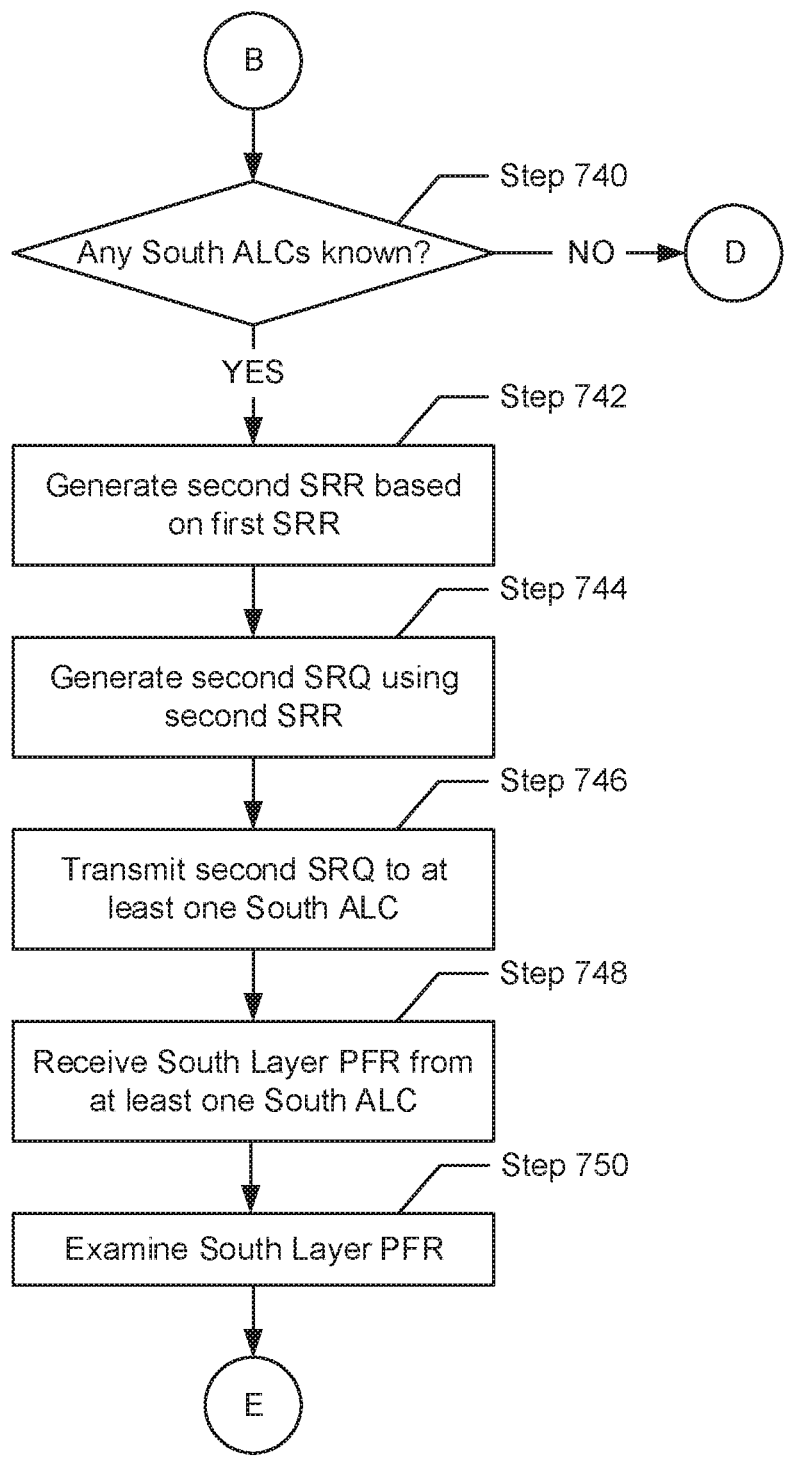

Turning to FIG. 7C, in Step 740, after determining (in Step 704) that the current LSR is unavailable; or after determining (in Step 720 that the current LSR is incompliant of at least one IOP, another determination is made as to whether any south ALCs are known. In one embodiment of the invention, a south ALC may refer to a logical intelligence that implements a master instance of a third abstraction layer, where the third abstraction layer lies directly below the first abstraction layer in the PDE model. Moreover, the determination may entail searching a controller data repository (CDR) for any south ALC addresses (e.g., Internet Protocol (IP) addresses, uniform resource locators (URLs), etc.) consolidated therein. If it is determined that at least one south ALC is known, then the process may proceed to Step 742. On the other hand, if it is alternatively determined that zero south ALCs are known, then the process may proceed to Step 766 (see e.g., FIG. 7D).

In Step 742, after determining (in Step 740) that at least one south ALC is known, a second SRR is generated based on the first SRR (obtained via the first SRQ received in Step 700). In one embodiment of the invention, generation of the second SRR may entail translating and/or expanding the first SRR, which may pertain to a first policy scope, into a second policy scope, where the first policy scope may be directed to the first abstraction layer (that which the current ALC may be, at least in part, implementing) and where the second policy scope may be directed to third abstraction layer (that which the at least one south ALC may alternatively be implementing).

In Step 744, a second SRQ is generated. Specifically, in one embodiment of the invention, the second SRQ may be generated using the second SRR (generated in Step 742).

Thereafter, in Step 746, the second SRQ (generated in step 744) is transmitted (or provided) to each south ALC of the at least one south ALC (identified via the determination performed in Step 740). In Step 748, a south layer PFR is received from each south ALC of the at least one south ALC (identified via the determination performed in Step 740). In Step 750, the south layer PFR(s) (received in Step 748) is/are examined. Specifically, the south layer PFR(s) may be examined to verify the contents therein.

Figure 7D:
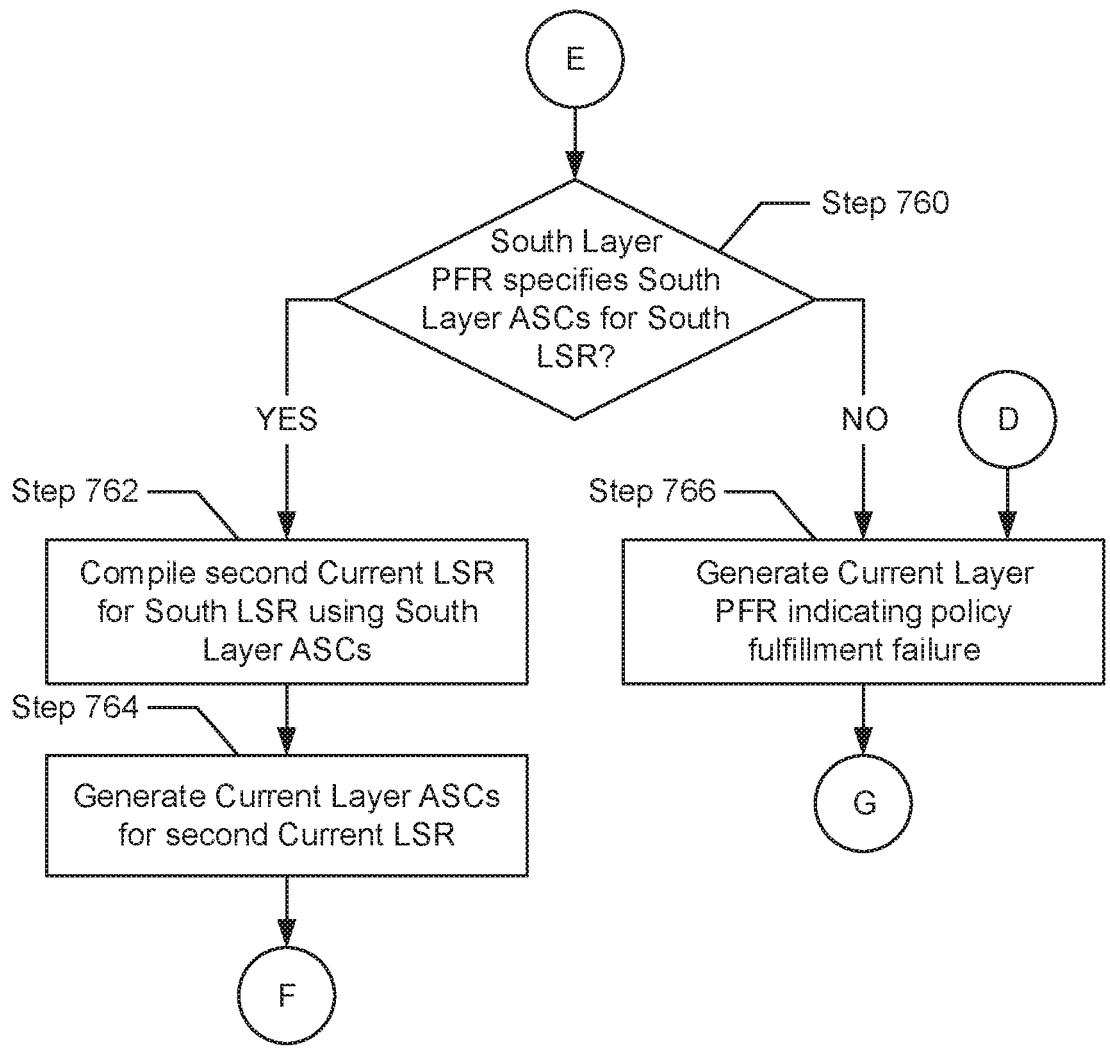

Turning to FIG. 7D, in Step 760, a determination is made as to whether any south layer PFRs (received n Step 748) specify south layer ASCs. In one embodiment of the invention, if south layer ASCs are specified, they may pertain to a south LSR that meets the second SRR (generated in Step 744). Substantively, if it is determined that at least one south layer PFR specifies south layer ASCs, then the process may proceed to Step 762. On the other hand, if it is alternatively determined that none of the south layer PFRs specify any south layer ASCs, then the process may proceed to Step 766.

In Step 762, after determining (in Step 760) that at least one south layer PFR specifies south layer ASCs, a second current LSR is compiled. Specifically, in one embodiment of the invention, the second current LSR may be compiled using the south LSR (identified via the determination performed in Step 760), as well as the south layer ASCs for the south LSR. For example, assume a south layer PFR, submitted by the disaggregated-hardware level (DHL), specifies south layer ASCs for a measured quantity of physical node resources (i.e., the LSR of the DHL). Then, the node-composer layer (NCL)—representative of the current layer in this example—may compile a second LSR (i.e., a complete computing system) using the south LSR and associated south layer ASCs.

In Step 764, current layer ASCs are subsequently generated for the second current LSR (compiled in Step 762). Thereafter, the process may proceed to Step 724 (see e.g., FIG. 7B), where: (a) a current layer PFR may be generated using the current layer ASCs (generated in Step 764); and afterwards, (b) the current layer PFR (generated in Step 724) is transmitted/provided to either the north ALC or the application developer (from which the first SRQ had been submitted in Step 700).

In Step 766, after determining (in step 760) that none of the south layer PFRs (received at Step 748) specify south layer ASCs, a current layer PRF is generated. In one embodiment of the invention, the current layer PRF may indicate or suggest that processing of first SRQ has led to a policy fulfillment failure. Hereinafter, the process may proceed to Step 726 (see e.g., FIG. 7B), where the current layer PRF (generated at Step 766) is subsequently transmitted to either the north ALC or the application developer.

Figure 8:
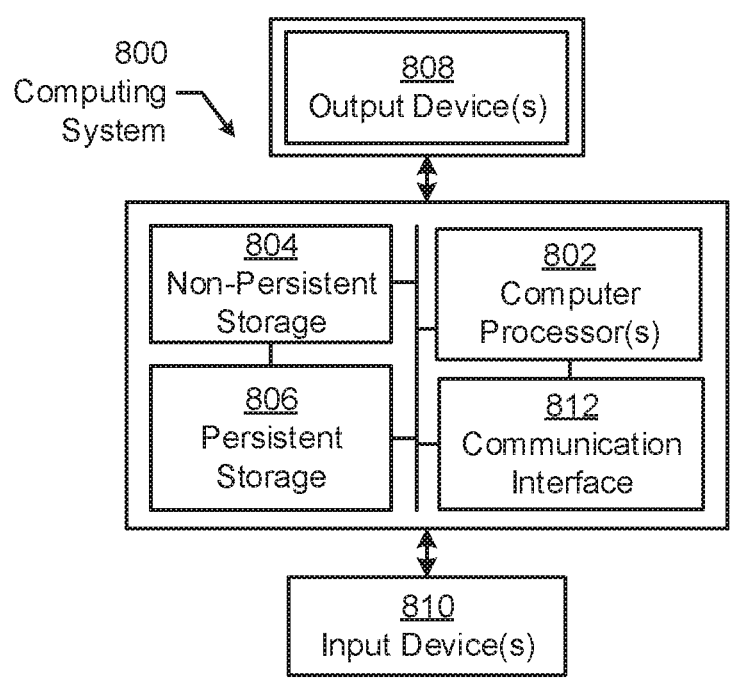
FIG. 8 shows a computing system in accordance with one or more embodiments of the invention.

FIG. 8 shows a computing system in accordance with one or more embodiments of the invention. The computing system (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing system (800) may also include one or more input devices (810), such as a touchscreen, keyboard, mouse, microphone, touchpad, electronic pen, or any other type of input device. Further, the communication interface (812) may include an integrated circuit for connecting the computing system (800) to a network (not shown) (e.g., a local area network (LAN), a wide area network (WAN) such as the Internet, mobile network, or any other type of network) and/or to another device, such as another computing device.

In one embodiment of the invention, the computing system (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (906). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for implementing layer-based policy enforcement, comprising:
  receiving, at a current abstraction layer controller (ALC), a first scoped resource query (SRQ) comprising a first scoped resource requirement (SRR), wherein:
    the current ALC implements a master instance of a first abstraction layer, wherein a south ALC implements another master instance of a second abstraction layer,
    the second abstraction layer is one selected from a group consisting of a disaggregated-hardware layer (DHL), a node-composer layer (NCL), a node-partition layer (NPL), a software-defined layer (SDL), and an execution-venue layer (EVL), and
    the first abstraction layer is the NCL when the second abstraction layer is the DHL, the first abstraction layer is the NPL when the second abstraction layer is the NCL, the first abstraction layer is the SDL when the second abstraction layer is the NPL, the first abstraction layer is the EVL when the second abstraction layer is the SDL, and the first abstraction layer is an application-platform layer (APL) when the second abstraction layer is the EVL;
  identifying, in a cluster resource pool (CRP), a first current layer-specific resource (LSR) that meets the first SRR, wherein the current LSR is located in the first abstraction layer with the current ALC;

making a first determination, by the current ALC in the first abstraction layer and based on evaluating the first current LSR of the first abstraction layer in view of an infrastructure operational policy (IOP), that the first current LSR is incompliant;
identifying, in response to the first determination, the south ALC;
generating a second SRR based on the first SRR;
generating a second SRQ using the second SRR; and
providing the second SRQ to the south ALC.

2. The method of claim 1, wherein the first abstraction layer lies directly above the second abstraction layer in a layer-based policy definition and enforcement (PDE) model.

3. The method of claim 1, wherein the first SRR is an infrastructure utilization requirement for executing an application workload on an information technology (IT) environment.

4. The method of claim 1, wherein the current ALC executes on a first node of an information technology (IT) environment, wherein the south ALC executes on one selected from a group consisting of the first node and a second node, of the IT environment.

5. The method of claim 1, wherein generating the second SRR based on the first SRR, comprises:
translating the first SRR from a first policy scope to a second policy scope,
wherein the first policy scope pertains to the first abstraction layer implemented, at least in part, by the current ALC,
wherein the second policy scope pertains to the second abstraction layer implemented, at least in part, by the south ALC.

6. The method of claim 1, further comprising:
receiving, from the south ALC, a south layer policy fulfillment report (PFR);
examining the south layer PFR to find south layer access and security credentials (ASCs);
compiling, in response to finding the south layer ASCs, a second current LSR based on a south LSR to which the south layer ASCs are directed;
generating first current layer ASCs for the second current LSR;
generating a current layer PFR using the first current layer ASCs; and
providing the current layer PFR to one selected from a group consisting of a north ALC and an application developer.

7. The method of claim 6, wherein the south LSR meets the second SRR.

8. The method of claim 7, wherein a south layer PFR is further examined to find a south layer resource cost function (RCF) associated with implementing, at least in part, an application workload.

9. The method of claim 1, further comprising:
receiving, from the south ALC, a south layer policy fulfillment report (PFR);
examining the south layer PFR to not find south layer access and security credentials (ASCs);
generating, in response to not finding the south layer ASCs, a current layer PFR indicating a policy fulfillment failure; and
providing the current layer PFR to one selected from a group consisting of a north ALC and an application developer.

10. The method of claim 1, further comprising:
receiving, at the current ALC, a third SRQ comprising a third SRR;

identifying, in the CRP, a second current LSR that meets the third SRR;
making a second determination, based on evaluating the second current LSR in view of the IOP, that the second current LSR is compliant;
generating, in response to the second determination, current layer access and security credentials (ASCs) for the second current LSR;
generating a current layer policy fulfillment report (PFR) using the current layer ASCs; and
providing the current layer PFR to one selected from a group consisting of a north ALC and an application developer.

11. The method of claim 1, further comprising:
receiving, at the current ALC, a third SRQ comprising a third SRR;
identifying, in the CRP, a second current LSR that meets the third SRR;
making a second determination, based on evaluating the second current LSR in view of the IOP, that the second current LSR is incompliant;
making a third determination, in response to the second determination, that zero south ALCs are known;
generating, based on the third determination, a current layer policy fulfillment report (PFR) indicating a policy fulfillment failure; and
providing the current layer PFR to one selected from a group consisting of a north ALC and an application developer.

12. A system, comprising:
a plurality of physical nodes;
a first controller kernel (CK) executing on a first physical node of the plurality of physical nodes, and programmed to:
receive a first scoped resource query (SRQ) comprising a first scoped resource requirement (SRR), wherein:
the first CK implements a master instance of a first abstraction layer, wherein a south ALC implements another master instance of a second abstraction layer,
the second abstraction layer is one selected from a group consisting of a disaggregated-hardware layer (DHL), a node-composer layer (NCL), a node-partition layer (NPL), a software-defined layer (SDL), and an execution-venue layer (EVL), and
the first abstraction layer is the NCL when the second abstraction layer is the DHL, the first abstraction layer is the NPL when the second abstraction layer is the NCL, the first abstraction layer is the SDL when the second abstraction layer is the NPL, the first abstraction layer is the EVL when the second abstraction layer is the SDL, and the first abstraction layer is an application-platform layer (APL) when the second abstraction layer is the EVL;
identify, in a cluster resource pool (CRP), a first current layer-specific resource (LSR) that meets the first SRR, wherein the current LSR is located in the first abstraction layer with the current ALC;
make a first determination, by the current ALC in the first abstraction layer and based on evaluating the first current LSR of the first abstraction layer in view of an infrastructure operational policy (IOP), that the first current LSR is incompliant;
identify, in response to the first determination, a second CK operatively connected to the first CK;
generate a second SRR based on the first SRR;
generate a second SRQ using the second SRR; and
provide the second SRQ to the second CK.

13. The system of claim 12, wherein the second CK executes on one selected from a group consisting of the first physical node and a second physical node, of the plurality of physical nodes.

14. The system of claim 12, further comprising:
a south abstraction layer controller (ALC) application programming interface (API) operatively connected to the first CK,
wherein the first CK interacts with the second CK through the south ALC API.

15. The system of claim 12, further comprising:
a third CK operatively connected to the first CK; and
a north abstraction layer controller (ALC) application programming interface (API) operatively connected to the first CK,
wherein the first CK interacts with the third CK through the north ALC API.

16. The system of claim 12, further comprising:
an instance kernel (IK) operatively connected to the first CK; and
a lateral abstraction layer instance (ALI) application programming interface (API) operatively connected to the first CK,
wherein the first CK interacts with the IK through the lateral ALI API.

17. The system of claim 12, further comprising:
an abstraction layer controller (ALC) comprising the first CK and the CRP.

18. A non-transitory computer readable medium (CRM) comprising computer readable program code, which when executed by a computer processor, enables the computer processor to:
receive, at a current abstraction layer controller (ALC), a first scoped resource query (SRQ) comprising a first scoped resource requirement (SRR), wherein:
the current ALC implements a master instance of a first abstraction layer, wherein a south ALC implements another master instance of a second abstraction layer,
the second abstraction layer is one selected from a group consisting of a disaggregated-hardware layer (DHL), a node-composer layer (NCL), a node-partition layer (NPL), a software-defined layer (SDL), and an execution-venue layer (EVL), and
the first abstraction layer is the NCL when the second abstraction layer is the DHL, the first abstraction layer is the NPL when the second abstraction layer is the NCL, the first abstraction layer is the SDL when the second abstraction layer is the NPL, the first abstraction layer is the EVL when the second abstraction layer is the SDL, and the first abstraction layer is an application-platform layer (APL) when the second abstraction layer is the EVL;
identify, in a cluster resource pool (CRP), a first current layer-specific resource (LSR) that meets the first SRR, wherein the current LSR is located in the first abstraction layer with the current ALC;
make a first determination, by the current ALC in the first abstraction layer and based on evaluating the first current LSR of the first abstraction layer in view of an infrastructure operational policy (TOP), that the first current LSR is incompliant;
identify, in response to the first determination, the south ALC;
generate a second SRR based on the first SRR;
generate a second SRQ using the second SRR; and
provide the second SRQ to the south ALC.

* * * * *